3,224,942
ANTI-INFLAMMATORY, ANTI-EDEMA AND ANTI-THROMBI DRUG

Gustav J. Martin, Philadelphia, Pa., assignor to William H. Rorer, Inc., Fort Washington, Pa., a corporation of Pennsylvania
No Drawing. Filed Jan. 15, 1962, Ser. No. 166,397
4 Claims. (Cl. 167—73)

The present invention relates to a systemic treatment for inflammation and edema, and to anti-thrombi therapy, including the drug dosage unit and the process of treatment.

The subject matter of the invention as applied to the drug dosage unit to treat inflammation and edema has been approved by the United States Food and Drug Administration, New Drug Application No. 12,527, effective October 9, 1961.

A purpose of the invention is to obtain drug which is more efficacious in the systemic application to inflammation and edema by virtue of its much greater specificity for certain substances in the mammalian body which must be acted upon.

A further purpose is to obtain more rapid action by a drug in the treatment of inflammation and edema, with correspondingly more rapid reduction of attendant pain.

A further purpose is to potentiate and/or replace antibiotics which are being administered to the mammalian body.

A further purpose is to facilitate intimate contact of chemotherapeutic agents and natural antibodies with pathogenic microorganisms in the mammalian body.

A further purpose is to facilitate intimate contact of chemotherapeutic agents and natural antibodies with diseased tissues in the mammalian body.

A further purpose is to avoid untoward symptoms or side effects, and to minimize allergic reactions in the treatment of inflammation and edema.

A further purpose is to avoid or minimize allergic reactions, untoward symptoms and side effects in the treatment of inflammation and edema.

A further purpose is to treat inflammation and edema more effectively both in human beings and in lower mammals.

A further purpose is to provide a drug effective for treatment of inflammation and edema which can be manufactured and sold at a lower cost than other drugs commonly used for the treatment of inflammation and edema.

A further purpose is to provide a drug for treatment of inflammation and edema which has very high stability in storage under normal conditions.

A further purpose is to ingest bromelain by mouth into the mammalian body in a dosage effective for treatment of inflammation and edema, to protect the dosage unit against inactivation in the stomach by an enteric coating and to release the bromelain in the intestine for absorption into the blood stream.

A further purpose is to provide an improved agent for anti-thrombic therapy in the mammalian body.

Further purposes appear in the specification and in the claims.

In the prior art, proteolytic enzymes have been extensively used in tenderizing meat, and clarifying beer. In the medical field, proteolytic enzymes such as trypsin and chymotrypsin have been found to be effective in the systemic treatment of inflammation and edema.

Since ancient times, decoctions and juices of the pineapple have been used to treat dysentery, as anthermintics and as treatments for the throat.

For many years, a proteolytic enzyme, bromelain, derived from the pineapple, *Ananas sativus*, has been available on the market and used in tenderizing meat and clarifying beer.

The proteolytic enzymes previously used in the systemic treatment of inflammation and edema have been derived from animal sources and have been difficult to obtain and expensive. Their action has been relatively slow.

Such drugs have been lacking in specificity and have tended to exert an undesirable depolymerizing action on fibrinogen, notwithstanding their desirable effects.

I have discovered that the proteolytic enzyme, bromelain, can be safely administered to human beings and lower mammals by mouth, and when so administered, exhibits remarkable properties in the systemic treatment of inflammation and edema which are not exhibited by any other known drug.

I wish at this point to warn that the administration should be of enterically coated bromelain by mouth, because there are serious dangers, such as the danger of shock, attending parenteral administration, and I, therefore, do not recommend parenteral administration.

Bromelain exhibits the remarkable property of great specificity for the substrates of the mammalian body which must be acted upon in the systemic treatment of inflammation and edema. The present invention is not restricted to the theory that bromelain acts directly, as it may act indirectly by plasmin activation. Also without limiting myself to any theory, I wish to suggest as a possible explanation that during the inflammatory process in the body of a mammal, in case of injury or disease, some of the fibrinogen present is converted to soft partially polymerized fibrin. The presence of this fibrin plugs pores of blood vessels. This is an important factor in producing stasis, a stoppage of normal flow of body fluids, which becomes apparent to the patient as a painful swelling.

Bromelain exerts a specific depolymerizing action on the fibrin, and thus lyses the fibrin, restores drainage and restores biological continuity through the inflamed tissues. Thus by natural processes, edema is reduced and inflammation is treated by increasing the permeability of the connective tissue. This increased permeability also facilitates access of antibiotics, chemotherapeutic agents and natural antibodies to the site of disease.

A remarkable feature is that while bromelain lyses fibrin rapidly, it acts on fibrinogen only about one-fifteenth as fast. This property appears to be unique, because trypsin acts on fibrin about one-fourth as fast as it acts on fibrinogen. Another proteolytic enzyme, papain, acts on fibrin only half as fast as does bromelain, and ficin acts on fibrin only one-fifteenth as fast as bromelain.

Thus, in considering the fibrinolysis/fibrinogenolysis ratio, bromelain is 60 times as selective as trypsin. Neubauer, 19 Experimental Medicine and Surgery 2–3 (June–September 1961). Didisheim, and Lewis, Proceedings Society Experimental Biology and Medicine, 93, October 13, 1956.

Considerable clinical data has been obtained from which it appears that bromelain exerts an unusually rapid action in reducing inflammation and edema and the attendant pain.

Bromelain has a further unusual property because it potentiates the action of antibiotics. That is, where bromelain is administered along with an antibiotic, the effectiveness of the antibiotic is greatly increased, apparently because of the increased permeability of the membranes. The property of potentiation is exhibited with a wide variety of antibiotics too numerous to mention, including the broad spectrum antibiotics, and antibiotics effective against specific gram-positive and gram-negative organisms. Examples of antibiotics with which potentiation is obtained are leucomycin, erythromycin, novobiocin, chloramphenicol and penicillin. In the potentiation treatment, the antibiotic is administered in its normal dosage and by its usual method, according to the U.S. Pharmacoepia and standard text books on pharmacology.

Bromelain in some cases actually dispenses with the need for antibiotics which otherwise would be needed in the treatment of diseases characterized by inflammation and edema.

In the form of administration of bromelain, the dosage unit, suitably a tablet or a capsule, is enteric coated with a suitable enteric coating which will cause the dosage unit to pass through the stomach of the mammal without being rendered ineffective, and to be absorbed in the intestine. The enteric coating will preferably meet USP XVI specification on Enteric Coating. A specific suitable enteric coating may be produced according to Remington, Practice of Pharmacy.

The drug will desirably be compounded with a pharmaceutically acceptable carrier, of which any of those recommended by Remington are suitable, examples being starch, sugar and calcium phosphate.

The dosage in the mammal body in treating inflammation and edema will range between 2 milligrams and 15 milligrams per kilogram of body weight per day, the initial dose preferably being between 2 milligrams and 7 milligrams per kilogram of body weight per day and the maintaining dose being between 1 milligram and 3 milligrams per kilogram of body weight per day.

When translated into the administration to the human adult, the dosage will suitably be in the range between 80 milligrams and 1000 milligrams per day, the initial dose being preferably between 160 milligrams and 320 milligrams per day and the maintaining dose preferably being between 80 milligrams and 160 milligrams per day.

The clinical work thus far conducted on the administration of bromelain has failed to indicate any evidence of untoward symptoms or side effects or of allergic reaction, and, therefore, it appears that even much larger doses of bromelain, for example as large as 1000 milligrams per day, may be administered as therapy for reduction of thrombi. The quantity for this purpose may be as small as 200 milligrams per day. For this purpose, the drug may be administered by the dosage units referred to herein.

In using bromelain as an anti-thrombi agent, the quantity administered to the mammalian body should be in the range between 4 and 30 milligrams per kilogram of body weight per day.

The bromelain used should be of high purity, and example of a suitable specification for the purity of the bromelain being as follows:

Ash—9 to 12% by weight
Casein units—Range 2250 to 2875. Average 2500 Rorer units
Moisture—5% by weight maximum The dosage unit itself will preferably carry 20 to 250 milligrams of bromelain, a suitable number of dosage units being administered by mouth to obtain the required daily dose.

Based upon clinical work to date, there appears to be no particular danger from administering a somewhat excessive dose, and since bromelain costs only about one-fiftieth as much as trypsin, it can be administered rather freely without any economic disadvantage.

DISEASES FOR WHICH BROMELAIN IS RECOMMENDED

Based upon clinical experience, bromelain is desirable as a systemic treatment for diseases and injuries which have as a symptom inflammation and/or edema, with or without attendant pain.

Bromelain is recommended in treatment of strains, fractures, traumatic injuries, cutaneous staphylococcus infections, peripheral vascular disease, rectal and perirectal abscesses, inflammation of bacterial, viral, allergic or chemical origin, phlebitis, peptic ulcers, iridocylitis, uveitus, conjunctivitis, cataract operations, postoperative cellulitis, pulmonary diseases and nephrotic syndrome.

Potentiation of antibiotics has been observed in pneumonia, bronchitis, pyelonephritis, cellulitis and other conditions requiring antibiotic therapy. Dr. Neubauer in the article above referred to, found that bromelain with antibiotic reduced the duration of the illness by one-third as compared to treatment with the antibiotic alone. This is believed to be due to the increase in permeability of the diseased tissue because of enzymatic proteolysis resulting in more effective contact of the antibiotic and of antibiotics with the pathogenic microorganisms.

EXPERIMENTAL

Absorption in the mammal body

In experiments using bromelain labeled with fluorescent dye, it has been established that bromelain is absorbed into the blood stream and is excreted in the urine five hours after oral administration. See article by Smyth, Brennan and Martin, 133 American Journal of Pharmacy 294 (August 1961). It was found that the significant levels of bromelain administered orally begins after about one hour and extends over a period of two or three hours.

Inhibition of rat paw edema

Tests have been conducted involving administration of bromelain to rats having rat paw edema, in comparison with papain, trypsin and ficin. There were no cures obtained from ficin, some effect obtained from papain, greater effect from trypsin (32%) in inhibition of edema, but still greater effect from bromelain (47%) in inhibition of edema. This procedure is used as a method of assay.

Irritability

Rats fed a mixture of mash containing 1.5% bromelain showed no ill effects. The snouts and paws, which usually break down when as much as 0.2% trypsin or chymotrypsin is administered, were unaffected after eight days of feeding the mash containing 1.5% of bromelain. When the concentration of bromelain was increased to 5% of the mash, a small degree of tissue breakdown was noted on the snout and paw. There was also some reduction of the diet, with loss of weight and death of some of the animals.

When papain and bromelain were administered intramuscularly or subcutaneously, inflammation occurred and destruction of tissue occurred.

Toxicity

Rabbits were given repeated intravenous injection of 10 milligrams per kilogram of body weight of bromelain.

They survived and showed no ill effects such as drooping of the ears (which results from dissolution of cartilage when papain is administered) and they experienced no respiratory difficulty. When 3 milligrams per kilogram of body weight of bromelain was rapidly injected into a rabbit, there was no drop in blood pressure.

*Clotting of blood*

10 milligrams of bromelain were injected intravenously and blood samples were taken from rabbits at various intervals. The clotting time and the clot lyses were recorded. Blood samples were taken by cardiac puncture.

It was found that the normal clotting time was 56 seconds, that within 10 minutes after administration of bromelain the clotting time increased to 8 minutes, and that within 24 hours it returned to normal.

Prior to administration of bromelain, there was no lysis at 37° C. in 24 hours, but 10 minutes after administration of bromelain the clot lysed within 18 hours, and subsequent blood samples showed normal lysis time.

*Observation in vitro*

When papain is added to fibrinogen solutions, it causes a clot to form which does not lyse after 4 hours, although digestion of the fibrinogen in the clot is occurring. Bromelain, on the other hand, does not cause clotting of fibrinogen. Thus, in an experimental system employing 1 milliliter of a 1% solution of bovine fibrinogen, 1 milliliter of bromelain containing 100 gamma of bromelain was added. In a similar system 100 gamma of papain was added. After various periods at 37° C., an equal volume of 10% trichloroacetic acid was added with agitation and the samples were kept standing for 30 minutes. The suspension in each case was filtered and the ultraviolet absorption at 280µ was obtained.

After 40 minutes the papain clotted the fibrinogen and the bromelain formed no clot of fibrinogen after 160 minutes.

Thrombin was added to each sample and in the case of the bromelain sample the fibrinogen became unclottable, suggesting that either the fibrinogen had been broken down or that anticoagulant properties had been introduced.

*Clinical results*

Extensive clinical work has been carried on at Philadelphia General Hospital, Germantown Hospital, Chestnut Hill Hospital, Rolling Hill Hospital, the clinic of the Philadelphia Municipal Employees Welfare Fund Association and the Municipal Welfare Clinic in Philadelphia, according to which numerous diseases and injuries involving inflammation and edema have been systematically treated with bromelain according to the present invention. The reader is referred to Neubauer, A Plant Protease for Potentiation of and Possible Replacement of Antibiotics, 19 Experimental Medicine and Surgery, No. 2–3 (June-Sepetmber 1961); Stayman and Stiffel, A Clinical Evaluation of a New Plant Proteolytic Enzyme, Journal of The Germantown Hospital (August 1961), and Cirelli, Treatment of Inflammation and Edema with Ananase, a Plant Proteolytic Enzyme Concentrate, Delaware State Medical Journal (1962).

A general summary of case histories of cases in which diagnosis has been claimed by the clinician appears in Table 1.

A total of 823 cases have been reported, including many for which claims are not made, showing improvement in 715 cases.

In this clinic, beginning April 1960, enteric coated tablets of bromelain according to the present invention were given as a routine treatment of all patients having diseases or conditions characterized by inflammation or edema. The tablet contained 20 milligrams of bromelain and two tablets were administered four times a day.

Clinical response was rated as excellent, good, fair or poor. An excellent or good rating meant that the results were above expectations based upon previous experience in treating the particular disease or condition without bromelain. A fair rating meant that the results were no better and a poor rating meant that the results were worse than would have been expected from previous treatment experience.

In most cases sharp improvement followed after initial treatment with bromelain.

TABLE 1

| | Sub-totals | Total Cases | Cases Improved |
|---|---|---|---|
| Contusions | | 36 | 33 |
|   Contusions | 15 | | |
|   Bruises | 2 | | |
|   Abrasions | 18 | | |
|   Crush injuries | 1 | | |
| Sprains | | 38 | 32 |
| Strains | | 6 | 6 |
| Hematomas | | 24 | 23 |
| Black eye | | 8 | 8 |
| Dislocations | | 4 | 3 |
| Postoperative tissue reactions | | 93 | 87 |
| Torn ligaments | | 6 | 6 |
| Fractures | | 46 | 45 |
| Lacerations | | 9 | 9 |
| Phlebitis and thrombophlebitis | | 45 | 44 |
|   Phlebitis | 13 | | |
|   Thrombophlebitis | 32 | | |
| Ulcerations | | 26 | 24 |
|   Varicose | 16 | | |
|   Decubitus | 1 | | |
|   Diabetic | 9 | | |
| Furunculosis and carbunculosis | | 24 | 24 |
|   Carbuncles | 9 | | |
|   Furuncles | 13 | | |
|   "Cutaneous staph. infections" | 2 | | |
| Perirectal abscess | | 17 | 16 |
|   Perirectal abscess | 12 | | |
|   Anal fistula | 5 | | |
| Antibiotics, facilitating: | | | |
|   Penetration of | | 55 | 50 |
|   Case histories on hand | 27 | | |
|   Additional cases in Dr. Neubauer's article | 28 | | |
| Cellulitis | | 113 | 104 |
|   "Cellulitis" | 29 | | |
|   "Abscess", not otherwise specified | 12 | | |
|   Dental inflammations and abscesses | 21 | | |
|   Eye inflammations not otherwise listed | 41 | | |
|   "Unexplained" inflammations | 10 | | |
| Total | | 550 | 514 |

TABLE 2.—RESPONSE OF INFLAMMATION AND EDEMA TO TREATMENT WITH BROMELAIN

| Diagnosis | Total No. Cases | Excellent or Good Response | |
|---|---|---|---|
| | | No. Cases | Percentage |
| Sprains and strains (peripheral sprains, sprains of spine) | 37 | 32 | 86.5 |
| Cutaneous Staphylococcus Infection (carbuncles, furuncles, cysts, abscesses) | 45 | 38 | 84.4 |
| Soft Tissue Trauma (contusions, abrasions, hematomas) | 26 | 21 | 80.8 |
| Inflammation from Cutting Procedures (postoperative conditions, effects of minor surgery) | 24 | 7 | 29.2 |
| Rectal and Perirectal Inflammation (abscesses, fistulas) | 18 | 12 | 66.7 |
| Fractures (simple fractures) | 18 | 15 | 83.3 |
| Peripheral Vascular Disease (venous inflammation with and without edema, venous inflammation with and without ulcerations, arterial inflammation with and without diabetes) | 11 | 6 | 54.5 |
| Burns (first and second degree) | 6 | 4 | 66.7 |
| Cellulitis | 11 | 11 | 100.0 |
| Miscellaneous (dental abscesses, epididymitis, miscellaneous edemas, etc.) | 23 | 16 | 69.6 |
| Total | 219 | 162 | 74.0 |

TABLE 3.—COMPARISON OF THERAPY WITH AND WITHOUT BROMELAIN AS JUDGED BY LENGTH OF TREATMENT PERIOD

| Diagnosis | With Bromelain | | Without Bromelain | |
|---|---|---|---|---|
| | No. of Cases | Treatment Period (median No. of days) | No. of Cases | Treatment Period (median No. of days) |
| Sprains and strains | 37 | 7 | 22 | 14 |
| Cutaneous staphylococcus infection | 45 | 8 | 24 | 20 |
| Soft tissue trauma | 26 | 7 | 21 | 7 |
| Inflammation from cutting procedures | 24 | 11 | 26 | 21 |
| Rectal and perirectal inflammation | 18 | 12 | 7 | 16 |
| Total | 150 | 8 | 100 | 16 |

TABLE 4.—RESULTS OF COMBINED BROMELAIN-ANTIBIOTICS THERAPY
[Comparative data for therapy with antibiotics alone shown in parentheses]

| Disease | Response to Treatment | | | | Comparative Data | | | |
|---|---|---|---|---|---|---|---|---|
| | Excellent | Good | Fair | Total No. Cases | Ave. Hospital Stay or Treatment Period (Days) | | Excellent Response, Percent | Excellent +Good Response Percent |
| I. Pneumonia Acute lobar and broncho-pneumonia: Staph. 3 cases, other bact. 1, viral 1 | 3 | 2 | 0 | 5(28) | 6 | (10) | 60.0 (14.3) | 100.0 (82.1) |
| II. Bronchitis Acute 8 cases, chronic 4 | 8 | 4 | 0 | 12(12) | 5 | (10) | 66.7 (16.7) | 100.0 (25.0) |
| III. Pyelonephritis Acute staph. 3, chronic staph. 3, other chronic 1 | 3 | 4 | 0 | 7(9) | 7.5 | (10) | 42.9 (33.3) | 100.0 (77.7) |
| IV. Cutaneous staph. Acute 1, chronic 6 | 5 | 0 | 2 | 7(5) | 12 | (12) | 71.4 (20.0) | 71.4 (60.0) |
| V. Peri-rectal and rectal abcess Acute 1, chronic 4 | 5 | 0 | 0 | 5 | 3 | | 100.0 | 100.0 |
| VI. Thrombophlebitis Acute 9, chronic 5 | 9 | 2 | 3 | 14(2) | 5 | (8) | 64.3 (0) | 78.6 (50.0) |
| VII. Cellulitis Acute strep. and staph 3 | 3 | 0 | 0 | 3 | 2 | | 100.0 | 100.0 |
| TOTAL | | | | 53(56) | 6 | (10) | 67.9 (17.9) | 90.6 (66.1) |

Table 2 shows the general results obtained by this clinic. No undesirable side effects attributable to the bromelain were observed.

Table 3 indicates the comparison of the therapy with and without bromelain as judged by length of treatment period in categories where there were 15 or more cases treated with bromelain.

The results are favorable to the treatment with bromelain in four categories and unfavorable in one category.

In the case of treatment of soft tissue trauma, beneficial effect was obtained in 80.8% of the cases.

Comments on experience with specific diseases and conditions are as follows:

In the case of sprains and strains, the painful swelling responded quickly to bromelain therapy, usually within a week. In 86% of the cases, pain subsided and the patient was able to return to work much sooner than was expected based on the past experience of the clinic. In the remaining 14% the results were the same as in previous treatments. Since bromelain has become available for test, the clinic has discontinued the use of local injections and taping.

In the case of cutaneous staphylococcus infection, 45 patients with carbuncles, furuncles, and abscesses were treated with bromelain alone or in conjunction with antibiotics. Many of the cases occurred during a period when virulent strains of staphylococcus were encountered. Bromelain alone was successful in treating the milder cases. Bromelain was beneficial in 84% of the cases treated. Recovery occurred in a surprisingly short time, since the median period was 8 days.

In the case of soft tissue trauma, various bruises, hematomas and ecchymoses were treated. Based on previous experience, the bromelain treatment was superior in 81% of the cases and about equal in 19%.

Where inflammation had occurred from cutting procedures, bromelain therapy was used in 24 post-operative cases, including breast amputations, toe amputations, hemorrhoidectomy, cholecystectomy, appendectomy and incision and drainage of abscesses. The results were superior in 29% and equal in 71%.

In rectal and perirectal inflammation such as abscesses and fistulas in a normally contaminated area, in two-thirds of the cases the results were better with bromelain and in one-third they were as good as with normal treatments. The time for recovery was materially shortened by bromelain.

In the case of fractures, edema usually develops and pressure under the cast is a common condition which frequently necessitates removal of the cast. In several cases where it was thought that the cast might have to be removed and reapplied, bromelain was administered and within 48 hours all pressure from edema disappeared. Bromelain has been administered to 18 patients with fractures. The results have been superior in 83% and equal in 13% of the cases, as compared to results obtained in prior practice.

Bromelain was administered to patients with peripheral vascular disease in which the lower extremities were involved. Previous therapy had included strapping, elevation, heat, Butozolidin, Orenzyme, analgesics and occasionally antibiotics. Bromelain has been used and other therapy has not been necessary since bromelain administration began. The response was superior in 55% and equal to previous results in 45% of the cases.

Bromelain has been administered in a few cases of first and second degree burns. The early appearance of healthy granulation tissue and the relatively shorter time for healing indicated superior results in two-thirds of the cases.

In cellulitis, bromelain was administered, either alone or concomitantly with soaks and/or antibiotics. In 11 cases treated with bromelain, response was judged to be superior because of the short time of cure (usually a week or less).

Bromelain has been administered in treatments of acne vulgaris in conjunction with parenteral doses of staphage antigen. 34 patients were treated who had had acne vulgaris for one or more years. The bromelain alone when administered for 12 weeks caused no appreciable benefit, and staphage antigen was administered alone with slight improvement, but when bromelain was administered with staphage antigen there was decided improvement in 6 to 8 weeks and marked improvement in 12 weeks. After 6 months of this treatment, the results are as follows: Excellent results have been obtained on 18 patients; good results on 15 patients, and poor results on 1 patient. No untoward reactions were observed.

In the conjoint use of antibiotics and bromelain, experiments were carried out at Rolling Hill Hospital and the Municipal Welfare Clinic in Philadelphia. One or a combination of the following antibiotics were employed: penicillin 3,000,000 units intramuscularly or intravenously every 6 hours; chloramphenicol 500 milligrams intramuscularly, intravenously or orally every 6 hours; erythromycin 250 milligrams orally every 6 hours; novobiocin 250 milligrams orally every 8 hours.

Table 4 compares the results obtained by administering antibiotics alone and by administering the antibiotics concomitantly with bromelain (eight 20 milligram enteric coated tablets of bromelain, given as two tablets, four times a day). Figures in parentheses show results for antibiotic alone.

It will be noted that the bromelain is a powerful potentiating agent for the antibiotic, since the treatment employing the antibiotic plus bromelain gave good or excellent results in 90.6% of the cases, while the treatment with the antibiotic alone gave good or excellent results in 66.1% of the cases.

The antibiotic will in many cases be combined with the bromelain in a single dosage unit of any of the types referred to. For example, 3,000,000 units of penicillin plus 20 milligrams of bromelain.

In view of my invention and disclosure, variations and modifications to meet individual whim or particular need will doubtless become evident to others skilled in the art to obtain all or part of the benefits of my invention without copying the composition and process shown, and I, therefore, claim all such insofar as they fall within the reasonable spirit and scope of my claims.

In view of my invention and disclosure, what I claim as new and desire to secure by Letters Patent is:

1. The method of systemically treating a mammal for the disintegration of thrombi which comprises ingestion by said mammal having said thrombi of an enterically coated dosage of four milligrams to thirty milligrams per kilogram of body weight of the mammal per day of bromelain.

2. The method of systemically treating a mammal for the reduction of inflammation and edema which comprises, ingesting an enterically coated dosage of one milligram to fifteen milligrams per kilogram of body weight of the mammal per day of bromelain.

3. An enterically coated dosage for mammals consisting essentially of bromelain in amount of four milligrams to thirty milligrams per kilogram of body weight of the mammal per day, and said enteric coating being of a sufficient thickness for said dosage to be ingested.

4. An enterically coated dosage for mammals consisting essentially of bromelain in amount of one milligram to fifteen milligrams per kilogram of body weight of the mammal per day, and said enteric coating being of a sufficient thickness for said dosage to be ingested.

References Cited by the Examiner

UNITED STATES PATENTS

| | | | |
|---|---|---|---|
| 2,930,736 | 3/1960 | Sullivan et al. | 167—73 |
| 3,004,893 | 10/1961 | Martin | 167—82.5 |
| 3,072,532 | 1/1963 | Innerfield | 167—73 |

FOREIGN PATENTS 600,032   6/1960   Canada.

OTHER REFERENCES

American Journal of Pharmacy, vol. 134, No. 1, page 31, January 1962.

LEWIS GOTTS, *Primary Examiner.*

FRANK CACCIAPAGLIA, JR., *Examiner.*

RICHARD L. HUFF, *Assistant Examiner.*